UNITED STATES PATENT OFFICE.

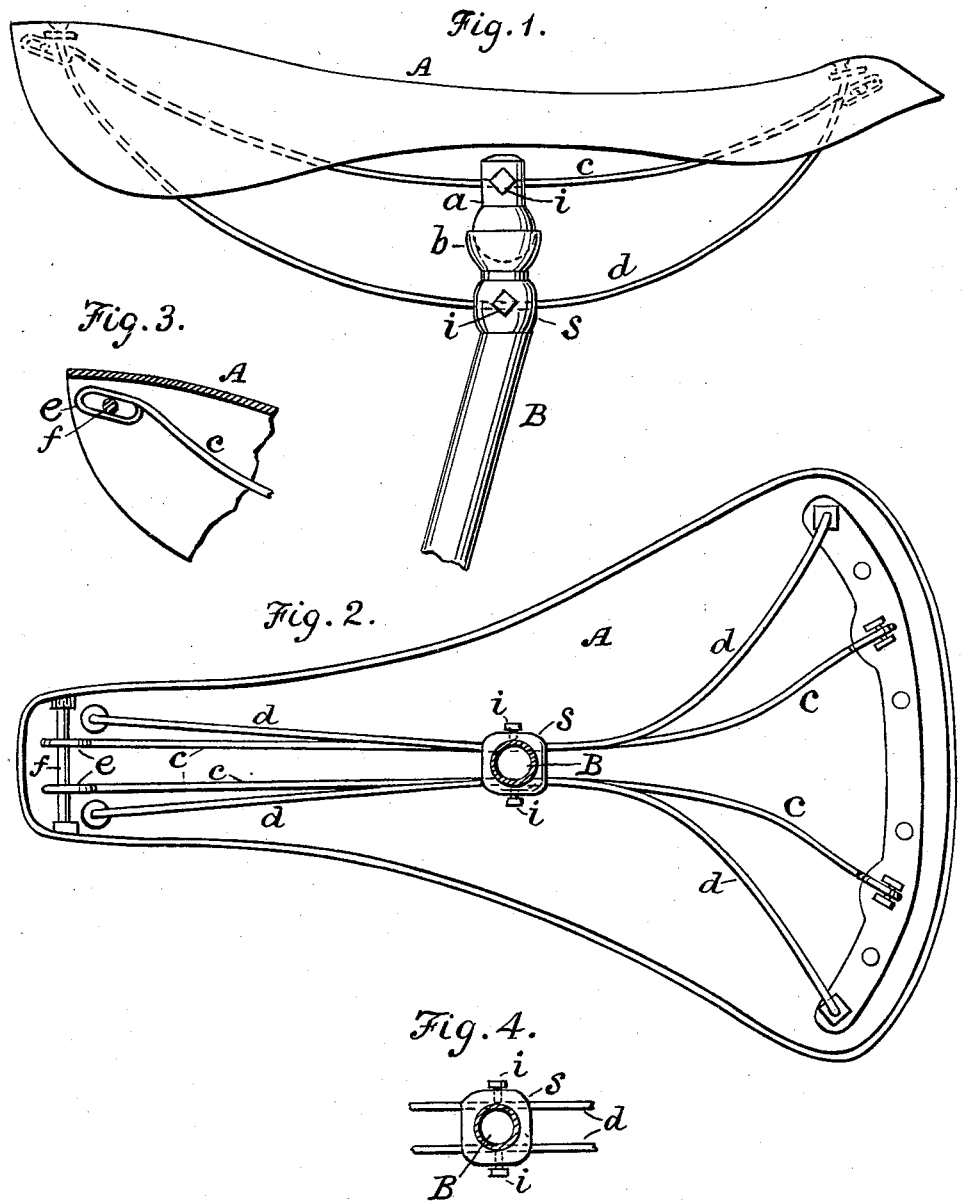

LOUIS BEYER, JR., OF WASHINGTON, DISTRICT OF COLUMBIA.

BICYCLE, &c.

SPECIFICATION forming part of Letters Patent No. 585,177, dated June 29, 1897.

Application filed April 1, 1896. Serial No. 585,759. (No model.)

*To all whom it may concern:*

Be it known that I, LOUIS BEYER, Jr., a citizen of the United States, residing at Washington, in the District of Columbia, have invented certain new and useful Improvements in Bicycles and other Styles of Velocipedes; and I do hereby declare the following to be a full, clear, and exact description of the invention, such as will enable others skilled in the art to which it appertains to make and use the same.

This invention relates to bicycles and other styles of velocipedes; and it consists in certain improvements in the construction of such vehicles, as hereinafter described and claimed.

In the accompanying drawings, Figure 1 represents a side view of a bicycle-saddle with its supporting-standard and connections constructed according to my invention. Fig. 2 represents an inverted plan view of the saddle and connections. Fig. 3 illustrates a loose connection of one of the springs with the saddle. Fig. 4 is a detail view showing an enlargement of the standard and connection of springs therewith.

A designates the bicycle-saddle, and B the supporting-standard, upon which the saddle is mounted. Near its upper end the said standard is divided and has a ball-and-socket joint, the portion formed with a ball being indicated by $a$ and the socket being indicated by $b$.

The saddle A is connected with the standard B by two springs $c$, which are passed through apertures in the ball portion $a$ above the joint and extend forward and rearward therefrom, and by two springs $d$, which are passed through apertures in the standard a little below the ball-and-socket joint and also extend forward and rearward, as shown. The springs are of sufficient strength to sustain the rider and are tempered to such a degree as to be sufficiently elastic to give a spring motion to the saddle.

The forward ends of the rods forming the springs $c$ are loosely connected with the saddle at its front end by means of loops $e$ and a fixed cross-bolt $f$, and the rear ends of said rods are also loosely connected with the saddle at its rear end in a similar manner. The springs $d$ are made fast to the saddle at their forward and rearward ends, and both sets of springs are adjustably secured by screws $i$ to the standard, so that they may be moved forward or rearward and secured in the desired relative position. The springs diverge rearward somewhat from the standard, and the latter may be enlarged somewhat where the springs $d$ are connected with it, as seen at $s$. By this construction of the spring connections of the saddle with the standard, the latter being provided with a ball-and-socket joint, the saddle will be self-adjusting and in operation will have a pleasant rocking motion, both laterally and longitudinally, corresponding with the motion of the rider, thus avoiding the rigidity of the saddles of bicycles and other velocipedes as now commonly constructed.

I claim—

1. The combination, with a saddle, of a supporting-standard provided with a ball-and-socket joint, springs which connect said saddle with said standard above said joint and springs connecting said saddle with said standard below said joint, substantially as and for the purposes described.

2. The combination, with a saddle, of a supporting-standard provided with a ball-and-socket joint, springs loosely connected with said saddle, at its front and rear ends, and adjustably secured to said standard above said ball-and-socket joint, and other springs secured to the front and rear ends of said saddle and adjustably connected with said standard below said joint, substantially as and for the purposes described.

In testimony whereof I have affixed my signature in presence of two witnesses.

LOUIS BEYER, JR.

Witnesses:
P. J. BRENNAN,
CHARLES G. SIMONS.